Sept. 17, 1940.    H. S. PARDEE    2,215,051
TRAIN CONTROL
Original Filed Feb. 9, 1931    2 Sheets-Sheet 1
FIG.1.
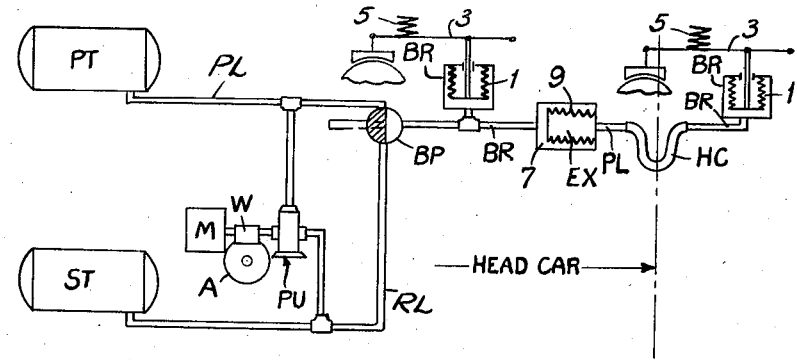
FIG.2.
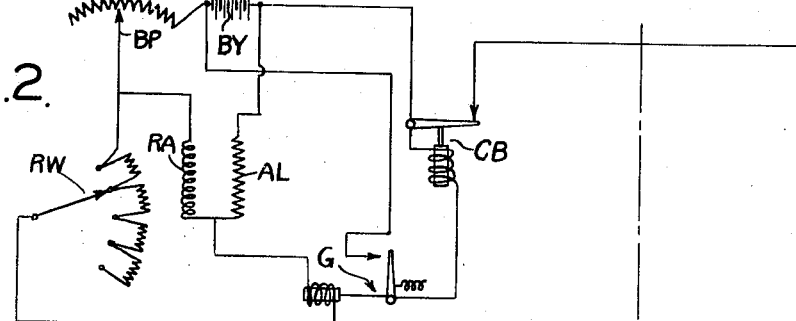
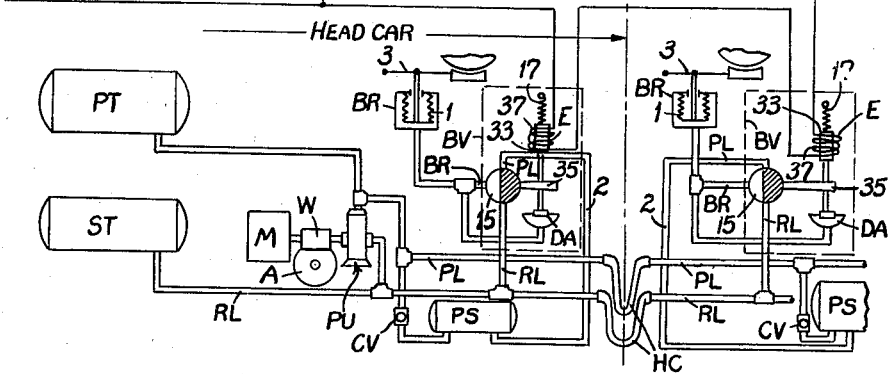
FIG.6.
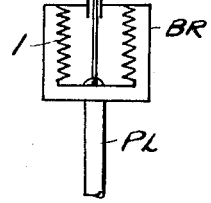
FIG.7.
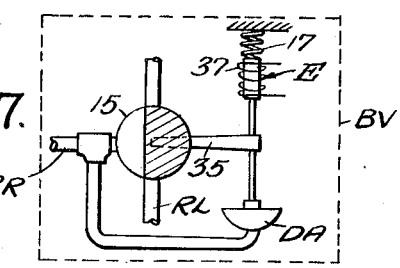
Harvey S. Pardee,
Inventor.
Delos G. Haynes.
Attorney.

Sept. 17, 1940.  H. S. PARDEE  2,215,051
TRAIN CONTROL
Original Filed Feb. 9, 1931   2 Sheets-Sheet 2
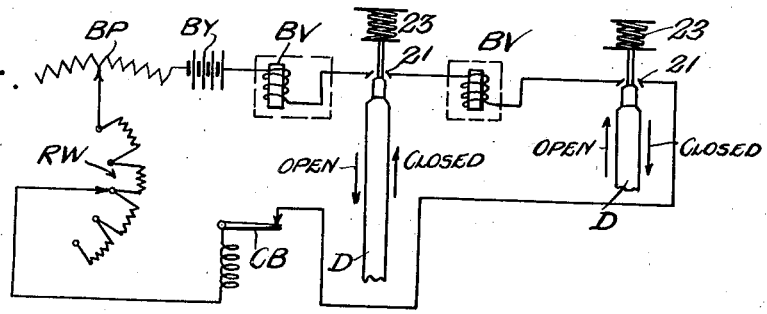
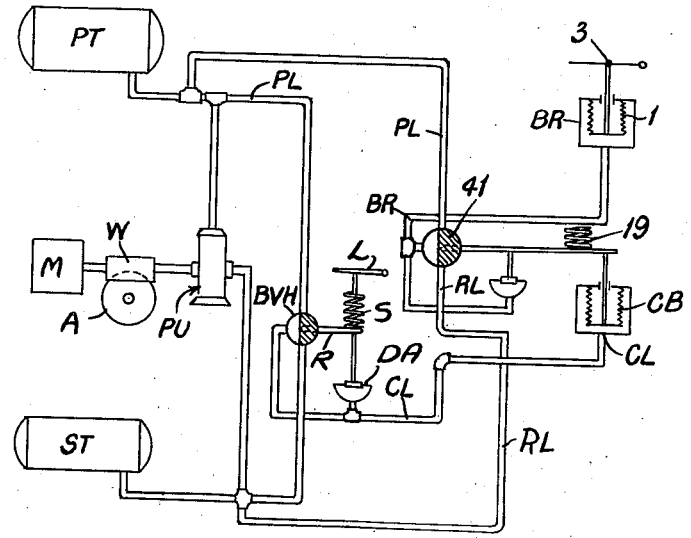
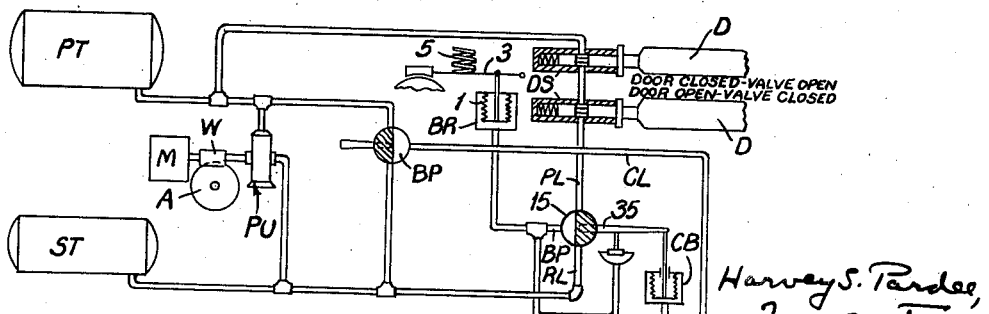

Patented Sept. 17, 1940

2,215,051

UNITED STATES PATENT OFFICE 2,215,051

TRAIN CONTROL

Harvey S. Pardee, Ravinia, Ill., assignor, by mesne assignments, to Hydromatic Corporation, Chicago, Ill., a corporation of Illinois Original application February 9, 1931, Serial No. 514,441. Divided and this application September 3, 1937, Serial No. 162,272

8 Claims. (Cl. 303—6.1)

This invention relates to control systems, and with regard to certain more specific features, to train control systems.

The invention comprises an improvement upon the control apparatus shown in my Patent 1,784,310.

The invention is a division of the invention described in my patent application, Serial No. 514,441, filed February 9, 1931, for Train control, eventuated into Patent No. 2,092,014, dated September 7, 1937.

Among the several objects of the invention may be noted the provision of a control system for operating the brakes, doors and related parts of conveyances such as rail cars, coaches, buses or the like in which an adaptation is made to trains of two or more vehicles.

Another object of the invention is to improvedly control from a single point one or more functions on several vehicles, there being effected a connection between the vehicles and certain automatic operating means whereby difficulties caused by a break in the train are minimized.

Another object of the invention is to effect optimum control of a limited number or any number of cars.

Another object is to provide a system adapted easily to coordinate brake control features with door control and like features.

Other objects will be in part obvious and in part pointed out hereinafter.

It is to be understood that the cars or conveyances or vehicles to which the invention may be applied may be driven by electric or other motors or means and are provided with the usual body constructions suiting them to their particular purposes.

The systems to be described herein refer to cars and trains of cars for street railway operation, electric and steam train operation and other trains of trucks and the like.

The vehicles referred to are provided with brakes, preferably of the friction type contacting with some rotating elements of the vehicles.

The invention accordingly comprises the elements and combinations of elements, features of construction, and arrangements of parts which will be exemplified in the structure hereinafter described, and the scope of the application of which will be indicated in the following claims.

In the accompanying drawings in which are illustrated several of various possible embodiments of the invention, Fig. 1 is a diagram illustrating certain connections in applying the invention to a train of a limited or low number of cars with the head car containing a control as well as brake energy generating and storage apparatus;

Fig. 2 is a diagram illustrating connections to be used in a train of any number of cars;

Fig. 3 is a diagram showing the use of a fluid control line instead of an electric control line;

Fig. 4 illustrates a method of coordinating door-operation with train operation;

Fig. 5 illustrates a form of door-control system;

Fig. 6 is a view showing a certain form of brake mechanism; and,

Fig. 7 illustrates an electromagnetic brake valve.

Similar reference characters indicate corresponding parts throughout the several views of the drawings.

The drive for the vehicle herein described may comprise the spur or worm gear type, with brakes operating in connection with a drive shaft or the wheels. In Fig. 1 such a drive is diagrammatically illustrated as comprising a motor M driving a worm W, the latter meshing with a suitable worm gear A on an axle of the vehicle. As above indicated, the brakes may include shoes which are pressed directly against the wheels.

The braking system herein is represented as comprising a system of brake lines and cylinders BR which force friction brakes against the driving parts of the vehicle. The brake cylinders BR receive fluid pressure in the ordinary manner but, instead of being provided with pistons, they are provided with internal, movable bellows 1 which are positively leak-proof. Each of the bellows 1 is connected on the outside with the brakes, this being done by means of a suitable linkage 3. On the inside, each bellows 1 is exposed to fluid pressure. The movement is enough to set and release the brakes.

As shown in Fig. 1, the brakes may be set by spring 5 reacting against the bellows 1 through the linkage 3. Thus when pressure is admitted to the bellows 1, the brakes are released against spring pressure. Or the conventional method may be used, such as shown in Fig. 6 and certain other figures, wherein fluid pressure operates directly through known linkages to set the brakes. It is to be understood that the construction shown in Fig. 6 may be applied to the other figures, as designated hereinafter. It is to be understood that the linkages 3 are representative of any type that may be desirable.

Bellows are also placed in series with the hose connections HC between cars (Fig. 1). In this case there are cylinders 7 with internal separating bellows 9 dividing cylinders 7 each into two chambers. The connections will be clarified hereinafter. It is to be understood that the bellows, wherever referred to herein, are representative of any and all types of substantially movable diaphragms or means adapted to transmit motion but to prevent passage of fluid.

As shown in Fig. 1 brake valve BP is a three-way, manually operable valve of the tapered plug or any other suitable type. It is used for connecting the brake line BR alternately to a pressure tank PT (over pressure line PL) or a sump tank ST (over release line RL). Modifications of this valve are used in different applications, including those involving automatic operation; and the connections therefor will be clear from the context.

An electromagnetic brake valve BV, in certain alternatives used on each car (Fig. 7), comprises an electromagnet E, the movable core 33 of which is connected to the actuating arm 35 of a three-way valve 15 and to the center of a diaphragm DA subjected on the opposite side to the pressure in the line BR leading to the brake cylinders. A spring 17 acts against the core 33 to move it in the direction of applying fluid pressure to the brake linkages 3. As the current in the coil 37 of the magnet E is increased the core acts against the spring and tends to shut off pressure from the pressure line PL to the brake line BR and next to connect the brake line BR to the return line RL, thus relieving the brake linkages of pressure. The reaction of the diaphragm DA is to oppose both actions and thus to bring about a condition of stable balance for each value of the control current. At zero current the spring overcomes the diaphragm pressure until full actuating pressure is admitted. At maximum current the core compresses the spring and turns the valve to release the pressure on the brake line (and under the diaphragm) so that finally the balance between spring and coil is reached with zero pressure on the diaphragm.

The tank PT comprises a pressure tank designed to withstand the air pressure used and to be air, oil and water tight, for example, the tank pressure may be 100 pounds per square inch.

The sump tank, indicated by letters ST, is under atmospheric pressure and preferably placed at the lowest part of the system to receive the drainage from the door engines (if there be such) and brake cylinders. The size of this tank is preferably such that when full it will hold such a quantity that, when substantially all of its contents are pumped into tank PT, the pressure in tank PT will be raised from minimum to slightly above a working maximum, providing tank PT is initially filled with air at the minimum operating pressure.

Other details regarding these tanks and their connections may be found in said Patent 1,784,310.

The hydraulic pump PU is preferably of the rotary positive type, and connected directly to a moving axle or propeller shaft of the vehicle. It thus starts and stops with the motion of the car or engine. It should be arranged with a minimum amount of initial slip so that when the pump starts the pressure on the delivery side will build up quickly. This pump needs to have but a small pumping capacity because the demands for liquid quantity are relatively small when non-expansive fluid is used instead of an expansible gas. By-passes and other auxiliary pump equipment are not here shown inasmuch as they have been disclosed in said Patent 1,784,310, enough having been herein disclosed to make clear the improvements.

Although it is possible to apply the present invention to a pneumatic system, it is preferable that a hydraulic system be used. The hydraulic fluid to be used in the present system comprises preferably a liquid relatively non-expansive and non-compressible as compared with gases such as air. It should be selected with a viscosity reasonably constant at the various operating temperatures; it should not corrode metal and should have a low enough vapor tension so as not to create an appreciable vapor pressure at the operating temperatures. It should not deteriorate with time or use. It will be seen from the above that fluids such as are now known for hydraulic braking systems may be used, or oil or the like.

The operation of the pump PU, pressure tank PT and sump tank ST has been made clear in Patent 1,784,310, but broadly speaking, the sump tank ST carries a charge of liquid (Fig. 1). The pressure tanks PT carry a charge of air. The pump PU pumps liquid from the sump tank ST into the pressure tank PT to build up the pressure therein to a point where said pressure is useful through the liquid as a compression link, to apply or release the brakes, depending upon whether the brakes are to be directly set or spring set. Excessive pressures are avoided by suitable pump by-passes and/or slip as stated in said patent.

The cars are each provided with a section of through pipe BR and the brake fluid is caused to move back and forth in the line as the control valve BP is moved between application and release positions, that is, between positions connecting train line or through pipe BR with the pressure tank PT and the sump tank ST.

In order to prevent loss of liquid in case of a break in the pipe line BR, there is provided the diaphragm or expansion bellows EX in the line at the rear of each car. The possible movement of this bellows is greater than the displacement necessary to operate the brake line bellows 1 which are in connection with the train line BR, so that the bellows EX has no effect in ordinary operation but acts to stop the flow should a break occur beyond the bellows.

Fig. 1 illustrates diagrammatically the connections, in which PU indicates the pump pumping liquid from the sump tanks ST into the pressure tanks PT partly filled with air under pressure. BP indicates the manually operable, three-way, brake valve connecting the line BR alternately to the pressure tank or to the sump tank. The bellows or pistons 1 of the brake cylinders operate to effect pressure on the brake shoes through the usual rigging or otherwise; or, as forecast above, the brake shoes may be applied by means of springs and the pistons of the brake cylinders act to withdraw the spring pressure when the fluid pressure is applied to the brake cylinders and associated line BR.

Fig. 1 shows the spring pressed type of brake control wherein the brakes are operated by the spring 5 through the rigging 3, the pressure in the brake cylinder arrangement BR reacting against the spring to release the brakes. Or, the arrangement of Fig. 6 may be applied to Fig. 1 by connecting the brake cylinder and line BR thereof to the line PL through valve BP when a brake setting is made.

Referring again to Fig. 1, the expansion bellows EX 9 is interiorly connected with the hose connections between the cars, that is, one of each of the two chambers of each bellows device EX is connected with the lines BR of successive cars. If a break occurs, such as in a hose connection, as shown at HC, the expansion bellows ahead is compressed and the brakes of the cars behind the break are automatically set if the brake linkage of Fig. 1 is used. No liquid is lost from the tank PT. This system is primarily applicable to cars pulling one or a few trailers, that is, with a relatively short train line PL, because of the requirement that the bellows EX have displacement greater than that required to operate all of the brake cylinders positioned thereafter in the train line. The cylinders BR may also represent cylinders for opening and closing doors controlled from the head car or for performing any other desirable operation. Two or more lines may be run, for instance, one for operating brakes, and another for operating doors.

It is clear that, if the spring-pressed brake linkage of Fig. 1 be used, a break in the train line beyond the bellows EX results in a pressure being taken off the bellows 1 with a resulting automatic setting by the springs 5, as above described.

If a brake linkage is used wherein direct action is employed from the pressure fluid to the friction surfaces, instead of employing a spring for storing energy and later applying it, then a break in the train line (Fig. 1) beyond the first car does not result in automatic brake setting but the operator in the first car can still set the brakes in the first car whenever he chooses. That is to say, a train line break does not result in loss of braking fluid.

It will be understood that, when the spring brake linkage is used, the tank PT is put into communication with the brake line BR when it is desired to force the brakes to release against spring pressure; and the line BR is placed in communication with the tank ST when it is desired to set said brakes by means of said springs. When the direct acting brake linkage of Fig. 6 is applied to the system of Fig. 1, brake setting is accomplished by placing the brake line BR into communication with the pressure tank PT by operation of valve BP.

In Fig. 2 is shown a second form of the invention. This second form of the invention has to do with a train of any number of cars wherein the control and brake energy generating apparatus are in the head car but each car contains energy storage means supplied from the head car, through a train pressure pipe line. On each car is a brake valve connecting the brake cylinders of that car alternately to the pressure tank on that car or to a return line running the length of the train and connecting into the sump tank on the head car. The operating valves on each car are controlled from the head car by electric lines. The control lines are arranged so that a break in them will set the brakes and the energy storage apparatus on each car is not dangerously affected by a break in the supply line. Should the train pull in two, both halves of the train are automatically stopped. Fig. 2 illustrates one form of this system showing equipment on the first two cars of a train. Similar letters refer to corresponding elements described in Fig. 1.

Referring to Fig. 2, PS indicates a pressure tank, one of which is installed on each car. The head car also carries a pressure tank PT. BV is an electromagnetically controlled brake valve on each car, BP is a rheostatic hand-controlled lever in the head car, BY is the operating source of E. M. F. and RL is the fluid return line. All of the brake valves BV operate simultaneously by control of the rheostat BP. Liquid pressure is thus admitted from the respective pressure tanks PS to the respective brake cylinders on the respective car, thus causing the brakes to be set or released, depending upon whether springs are used to apply the brakes or direct fluid pressure. The direct fluid pressure method is shown in the brake linkages of Fig. 2. When the fluid is released it flows to the return line and to the sump tank ST from where it is pumped to the pressure tank PT as set forth in said Patent 1,784,310.

Between the train lines PL and each storage tank PS is a check valve CV which prevents the local storage tank from discharging back into the line in the event of a break in the train line. But each tank PS delivers to the proper valve BV by way of line 2.

The brake valves BV are arranged so that a continuous current is required to hold the valves in release positions. As this current is diminished, the brakes are applied, reaching full application when the current approaches zero. Full application consequently also occurs when the electric train control line is broken for any reason.

The electric train control line is also subject to accidental short-circuits which might act to set the brakes on only part of the train. Therefore, for protection against any change in the resistance of the line due to open circuit or short circuit, partial or complete, there is used the Wheatstone bridge arrangement of resistances AL, RA, RW and the electromagnetic valves BV, with a relay G connected across the bridge between resistances AL and RA on one hand, and RW and BV on the other hand. AL and RA are relatively high resistances; and AL is preferably arranged with sufficient self-inductance so that its time constant is substantially the same as the control line containing the electromagnetic valves. This keeps the bridge in balance during momentary changes in current flow.

The relay G which is connected across the bridge, as shown, is balanced in open position during normal operation, but any substantial change in the resistance of the line, greater or less than normal, will close the contact on said relay G and close the operating coil of a circuit-breaker CB to open the train line control circuit. This acts through the electromagnetic valves BV to set the brakes on all cars at once.

As more or fewer cars are used in the line the resistance RW is adjusted so that the relay G is in balance and this balance is maintained regardless of the current used to operate the valves. Control of the system is entirely through the rheostatic controller BP which carries the current in the line to the valves BV. This variation may also be obtained by taking variable taps from the battery instead of using a rheostat.

Application of the brake system of Fig. 2 is accomplished by moving the rheostatic controller BP so as to cut out resistance. This increases the current in the coils E and forces down the levers 35 to connect lines PL with the brake lines BR so that pressure flows against the bellows 1. Under this condition the springs 17 are stretched. Under this condition also a balancing pressure is applied at diaphragms DA which have a mechanical connection with the levers 35 to counter-balance the brake-applying effect of coils E for aiding the return action of springs 17. Thus, the three-way valves 15 are self-balancing or self-lapping, that is to say, they take up positions which are proportional to the position of the rheostatic controller BP.

Release is accomplished by returning the rheostatic controller BP to insert resistance, whereupon the action is reversed. In this case, weakening of current in the coils E permits the sum of the pressures on diaphragms DA and springs 17 to return the valves 15 to a closed position and then to a position wherein the brake cylinders BR are drained through the three-way valves 15 to the release lines RL.

It will be noted in connection with Fig. 2 that the solenoids of the brake valves BV are connected in series.

As shown in Fig. 3, instead of an electric line transmitting the control pressure from the controller in the head car it is possible to use hydraulic or pneumatic means operating through a separate pipe line. Pistons or expansion bellows supplant the electromagnets previously described. A reduction of pressure may be used to apply the brakes.

The controller comprises any suitable three-way valve, such as valve BVH, adapted to admit variable pressure to the control line CL and exhaust to the sump. This valve is self-lapping or self-balancing by reason of back-pressure from diaphragm DA acting against spring S. The spring S is located to transmit force from the manually operable lever L to the lever R of the valve BVH. The valve BVH is hand or foot actuated so that a variable pressure and/or movement on the control lever thereof will effect corresponding pressure variation in the control line CL.

Upon manually controlling the valve BVH, hydraulic pressure exerted in the control line CL acts to move bellows CB against the differential action of a spring 19. Control is balanced by the pressure under a diaphragm DA under valve BVH. By means of a three-way relay valve 41 pressure is shut off from the pressure supply line PL to the brake line BR and later to connect the brake line BR to the exhaust or release line RL. This effects setting of the brakes if they are spring set. Upon release, the inverse series of events occurs.

If the brakes are to be directly applied, it is only necessary to change the relative actions of the valves BVH and 41.

For instance, if the lines PL and RL connected to valve 41 are interchanged (leaving the other apparatus as shown) then, in the case of directly set brakes, increased pressure in the control line will act to apply pressure to the brake cylinder and apply the brakes.

It will be seen that in the modification of Fig. 3 the bellows CB, with diaphragm DA, valve 41 and associated parts, takes the place of the electrical valve BV of the forms shown in Fig. 2 and the handle L of valve BVH takes the place of the rheostat BP.

It will be seen from the above that the valve BVH in Fig. 3 and valve BP in Fig. 5 may each be considered as a master control valve, the action of which is relayed to the valve 41 (Fig. 3) or the valve 15 (Fig. 5). The relay action in Figs. 2 and 4 is from the rheostat BP to the brake valves. It will therefore be clear that one master valve such as BVH or BP, as the case may be, can serve a plurality of valves 41 or 15, as the case may be, in different cars.

In certain classes of trains it is desirable to open and close doors in conjunction with the stopping and starting of the train. At the same time it is desirable to interlock the door operation so that the brakes cannot be released while the doors are open.

The doors may be operated by fluid means from the same power sources as the brake cylinders but through a separate door control line. If the brake control circuit is electrical, the same may be opened by a suitable series contact at each door so that the brake control circuit is opened whenever any door is not completely closed. This makes it necessary for all the doors to be closed before the train can be started.

Fig. 4 illustrates the system last referred to. The doors D are adapted when open to cause opening of the contacts 21, this being done by the action of springs 23. Thus when the doors are open, the control circuit is open and hence the brakes are set in the manner hereinbefore described.

It is clear that, where a fluid control line is used, the fluid circuit may be opened and closed by means of a suitable valve operable at each door, each valve comprising a substitute for the contact 21. An embodiment of this feature is shown in Fig. 5 wherein the doors D are caused to open the pressure line PL at valves DS whenever the doors are all fully closed. If the valve BP is set for release, the brakes will take release position when, and only when, the last door closes, because that is the only way in which pressure can reach the cylinder BR in order to compress spring 5 to take pressure from the brake shoes.

It should be understood that the valve BVH in Fig. 3 and the door valves DS in Fig. 5 and the door switches 21 in Fig. 4 all constitute secondary means for controlling the main three-way device (41 in Fig. 3; 15 in Fig. 5; and 15 in Fig. 4, when read in connection with Fig. 2).

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Control apparatus comprising brake lines, release lines, pressure lines, and control lines, a three-way valve associated with said pressure lines, brake line and release lines, means for operating said valve by pressure in said control lines comprising a movable diaphragm, a second diaphragm operable in connection with valve moving means, said second diaphragm being subject to pressure in said brake lines, whereby fluid control is used for operating said valve and whereby balanced conditions are the same for each position of said valve.

2. Brake control apparatus comprising a pressure tank, a sump tank, a pressure line from the pressure tank, a release line to the sump tank, a brake line, a self-lapping three-way valve between the pressure and brake and release lines, fluid-operated means for operating said three-way valve, and a fluid control line connecting the pressure tank with said fluid-operated means.

3. Brake control apparatus comprising a pressure tank, a sump tank, a pressure line from the pressure tank, a release line to the sump tank, a brake line, a self-lapping three-way valve between the pressure and brake and release lines, fluid-operated means for operating said three-way valve, a fluid control line connecting the pressure tank with said fluid-operated means, and a manually operated three-way valve between the pressure line, release line and control line.

4. Brake control apparatus comprising a pressure tank, a sump tank, a pressure line from the pressure tank, a release line to the sump tank, a brake line, a self-lapping three-way valve between the pressure and brake and release lines, fluid-operated means for operating said three-way valve, a fluid control line connecting the pressure tank with said fluid-operated means, and a manually operated three-way valve between the pressure line, release line and control line, said last-named valve being of the self-lapping type.

5. Brake control apparatus comprising a pressure tank, a sump tank, a pressure line from the pressure tank, a release line to the sump tank, a brake line, a three-way valve device between the pressure and brake and release lines, hydraulic means for operating said three-way valve device comprising a three-way valve, a control line from said last-named three-way valve to the three-way valve device, and pressure and release lines associated with said last-named three-way valve.

6. Brake control apparatus comprising a pressure tank, a sump tank, two connections from the pressure tank to the sump tank, a brake line associated with one connection, a control line associated with the other connection, a brake valve associated with the brake-line connection and a control valve associated with the control-line connection, fluid-operated means for operating the brake valve, said control valve being adapted to vary the pressure in the control line to effect operation of said brake valve.

7. Brake control apparatus comprising a pressure tank, a sump tank, two connections from the pressure tank to the sump tank, a brake line associated with one connection, a control line associated with the other connection, a brake valve associated with the brake-line connection and a manually operated control valve associated with the control-line connection, fluid-operated means for operating the brake valve, said manually controlled valve being adapted to vary the pressure at the control line to effect operation of said brake valve, said manually operated valve being self-lapping.

8. Brake control apparatus comprising a pressure tank, a sump tank, two connections from the pressure tank to the sump tank, a brake line associated with one connection, a control line associated with the other connection, a self-lapping brake valve associated with the brake-line connection and a self-lapping manually operated control valve associated with the control-line connection, fluid-operated means for operating the brake valve, said control valve being adapted to vary the pressure at the control line to effect operation of said brake valve.

HARVEY S. PARDEE.